United States Patent [19]
Satou et al.

[11] Patent Number: 5,315,378
[45] Date of Patent: May 24, 1994

[54] GAMMA CORRECTION AND WHITE BALANCE ADJUSTMENT METHOD AND APPARATUS FOR PROJECTION DISPLAY

[75] Inventors: Hiroaki Satou, Minoo; Tsutomu Muraji, Ikoma, both of Japan

[73] Assignee: Matsushita Electric Industrial Co. Ltd., Osaka, Japan

[21] Appl. No.: 970,777

[22] Filed: Nov. 3, 1992

[30] Foreign Application Priority Data

Nov. 6, 1991 [JP] Japan .................. 3-289706

[51] Int. Cl.$^5$ .................. H04N 9/73; H04N 9/31; H04N 5/74; H04N 5/66
[52] U.S. Cl. .................. 348/655; 348/658; 348/675; 348/745; 348/761; 348/181
[58] Field of Search .................. 358/29, 32, 60, 64, 358/10, 74, 65, 56; H04N 5/66, 5/74, 9/73, 9/68, 9/16, 9/31, 9/30, 9/64

[56] References Cited

U.S. PATENT DOCUMENTS

| | | | |
|---|---|---|---|
| 4,706,108 | 11/1987 | Kumagi et al. | 358/10 |
| 4,751,566 | 6/1988 | Pilot | 358/32 |
| 4,804,887 | 2/1989 | Miyama et al. | 313/495 |
| 4,868,668 | 9/1989 | Tauernetti | 358/10 X |
| 5,181,103 | 1/1993 | Aoyama | 358/64 |
| 5,216,504 | 6/1993 | Webb et al. | 358/10 |
| 5,257,096 | 10/1993 | Oshima | 358/10 |

FOREIGN PATENT DOCUMENTS

| | | | |
|---|---|---|---|
| 3-432877 | 3/1986 | Fed. Rep. of Germany | H01J 31/12 |
| 62-38088 | 2/1987 | Japan | H04N 5/74 |
| 2-33838 | 2/1990 | Japan | H01J 31/12 |
| 3-34788 | 2/1991 | Japan | H04N 5/66 |
| 3-186071 | 8/1991 | Japan | H04N 5/66 |

Primary Examiner—James J. Groody
Assistant Examiner—Safet Metjahic
Attorney, Agent, or Firm—Ratner & Prestia

[57] ABSTRACT

A gamma correction and white balance adjustment device has a calculator for calculating brightness target values expected to produce on a screen in response to calculated input signals to be applied to a CRT. The calculated input signals are actually applied to the CRT and the actual brightness values observed on the screen are measured. A table of a list of the calculated input signals expected to produce the brightness target values and a corresponding list of measured input signals which actually produced the calculated brightness target values is formed. An amplitude conversion circuit is provided for converting the amplitude of the input signal, which is equal to the calculated input signal, to that of the measured input signal in accordance with the obtained table.

13 Claims, 9 Drawing Sheets

GAMMA CORRECTION AND WHITE BALANCE ADJUSTMENT METHOD AND APPARATUS FOR PROJECTION DISPLAY

BACKGROUND OF THE INVENTION

1. Field of the Invention

The present invention relates to a method and apparatus for gamma correction and white balance adjustment in a projection display device wherein color images are obtained by synthesizing red, blue, and green projection images.

2. Description of the Prior Art

A typical projection display obtains a color image by projecting and synthesizing on screen three images each of a single color, specifically red, green and blue. Projection display systems can be either a self-luminescent system (e.g., CRT system) or light valve system (e.g., liquid crystals used as light valves) depending on the method of generating the projection image.

In the self-luminescent system a CRT or other light-emitting device is used to generate three primary color (red, green, blue) images which are projected by an optical projection system to overlap on the screen and form a full color image. The CRT projection display system uses three CRTs to generate the separate red, green, and blue images. A widely used method for adjusting the white balance in the self-luminance system is to adjust the RGB source signal levels in each CRT and to absorb individual differences in the emission intensity and spectrum of each CRT.

In the light valve system, three primary color (red, green, blue) images are projected by an optical projection system to overlap on screen and form a full color image by passing light from red, green, and blue backlight sources through corresponding light valves, and controlling the transmittance of the passed lights at each of the light valves.

Recent broadcasting systems apply gamma correction for CRT (referred to as a CRT gamma correction) at the broadcasting station so that the transmitted signals already contain CRT gamma correction characteristics. However, because every CRT projection system including its driving circuit has its own characteristics, the CRT gamma correction added to the broadcasting signal does not always match the CRT gamma correction required in each CRT projection system. Thus, it is necessary to apply CRT gamma correction to each CRT projection system in order to achieve gradation characteristics.

In the light valve system and in non-CRT self-luminescent systems, the gradation characteristics of the image are dependent upon the emission characteristics of the light emitting element or the transmission characteristics of the light valves.

The transmission characteristics of the light valve in a liquid crystal light valve system is shown in FIG. 8a. The light valve also has its own characteristics; the gamma correction for the light valve (referred to as a LV gamma correction) is required to each and individual light valve projection display system to obtain gradation characteristics equivalent to a CRT display. Various circuit designs have been proposed to obtain LV gamma correction characteristics, and one example is shown in FIG. 9a.

This circuit comprises a first circuit 110 for compressing a preset video signal component of >3 V, and a second circuit 111 for limiting the compression operation of the first circuit 110. The LV gamma correction characteristics shown in FIG. 9b is obtained by the second circuit 111 functioning to restrict the compression operation of the first circuit 110 when the video signal component compressed by the first circuit 110 exceeds a preset voltage (4 V). The result is an input/output characteristic that approximates the LV gamma correction curve (FIG. 9b) for the transmittance-voltage characteristics of the liquid crystals.

The conventional method can provide basic white balance and gradation characteristics control. In a conventional direct-view CRT television, however, the white balance is dependent upon the emission strength and emission spectrum of the RGB phosphors in the CRT surface, and the RGB color signal levels. In a CRT projection display system, however, the image white balance is also dependent upon the spectral characteristics of the RGB image projection optics. In the light valve projection display system, the white balance depends upon the light valves, the transmittance of the light valves to each color, and the spectral characteristics of the projection optics. As a result, conventional methods of applying level adjustment and gamma correction to each signal are unable to provide precision white balance tracking across all RGB color signal levels.

SUMMARY OF THE INVENTION

Therefore, an object of the present invention is to improve the gradation characteristics and white balance tracking capability of a color projection display system.

To achieve this object, according to the present invention, a method for white balance adjustment in a color projection display device having first, second and third color light emitting means comprises the steps of: (a) setting a desired white balance values; (b) applying a predetermined luminance signal to each of said first, second and third color light emitting means in separate time slot to form first color, second color and third color raster images; (c) measuring chromaticity values on a screen for each of first color, second color and third color raster images; and (d) obtaining a target mixture ratio of the first color, second color and third color projection lights from the measured chromaticity values of the first, second and third colors and the set desired white balance values.

According to the present invention, a method for gamma correction and white balance adjustment in a color projection display device having first, second and third color light emitting means, comprising the steps of: (a) setting a desired white balance values; (b) applying a predetermined luminance signal to each of said first, second and third color light emitting means in separate time slot to form first color, second color and third color raster images; (c) measuring luminance value and chromaticity values on a screen for each of first color, second color and third color raster images; (d) obtaining a target mixture ratio of the first color, second color and third color projection lights from the measured chromaticity values of the first, second and third colors and the set desired white balance values; (e) detecting a color with the weakest brightness; (f) calculating, with respect to the detected color, calculated brightness target values expected to produce on the screen in response to calculated input signals to be applied to a light emitting means of the detected color; (g) measuring, with respect to the detected color, actual brightness values produced on the screen in response to the calculated input signals actually applied to the light emitting means of the detected color; (h) obtaining, with respect to the detected color, a table of a list of the calculated input signals expected to produce the brightness target values and a corresponding list of measured input signals which actually produced the calculated brightness target values; and (i) applying, with respect to the detected color, an amplitude conversion means for converting the amplitude of the input signal, which is equal to the calculated input signal, to that of the measured input signal in accordance with the obtained table.

According to the present invention, a method for gamma correction and white balance adjustment in a color projection display device having first, second and third color light emitting means, comprises the steps of: (a) setting a desired white balance values; (b) applying a predetermined luminance signal to each of said first, second and third color light emitting means in separate time slot to form first color, second color and third color raster images; (c) measuring luminance value and chromaticity values on a screen for each of first color, second color and third color raster images; (d) obtaining a target mixture ratio of the first color, second color and third color projection lights from the measured chromaticity values of the first, second and third colors and the set desired white balance values (e) detecting a color with the weakest brightness; (f) calculating, with respect to the detected color, a calculated brightness target value expected to produce on the screen in response to a calculated input signal to be applied to a light emitting means of the detected color; (g) measuring, with respect to the detected color, an actual brightness value produced on the screen in response to the calculated input signal actually applied to the light emitting means of the detected color; (h) obtaining, with respect to the detected color, a revised input signal, through measurement, which actually produces the brightness target value, and a ratio of the revised input signal to the calculated input signal; and (i) applying, with respect to the detected color, an amplitude conversion means for converting the amplitude of the input signal, which is equal to the calculated input signal, to that of the revised input signal.

According to the present invention, a device for white balance adjustment in a color projection display device comprises: first, second and third color light emitting means for emitting three primary color on a screen; means for setting a desired white balance values; means for applying a predetermined luminance signal to each of said first, second and third color light emitting means in separate time slot to form first color, second color and third color raster images; means for measuring chromaticity values on said screen for each of first color, second color and third color raster images; and means for obtaining a target mixture ratio of the first color, second color and third color projection lights from the measured chromaticity values of the first, second and third colors and the set desired white balance values.

According to the present invention, a device for gamma correction and white balance adjustment in a color projection display device comprises: first, second and third color light emitting means for emitting three primary color on a screen; means for setting a desired white balance values; means for applying a predetermined luminance signal to each of said first, second and third color light emitting means in separate time slot to form first color, second color and third color raster images; means for measuring luminance value and chromaticity values on said screen for each of first color, second color and third color raster images; means for obtaining a target mixture ratio of the first color, second color and third color projection lights from the measured chromaticity values of the first, second and third colors and the set desired white balance values; means for detecting a color with the weakest brightness; means for calculating, with respect to the detected color, calculated brightness target values expected to produce on the screen in response to calculated input signals to be applied to a light emitting means of the detected color; means for measuring, with respect to the detected color, actual brightness values produced on the screen in response to the calculated input signals actually applied to the light emitting means of the detected color; means for obtaining, with respect to the detected color, a table of a list of the calculated input signals expected to produce the brightness target values and a corresponding list of measured input signals which actually produced the calculated brightness target values; and means for applying, with respect to the detected color, an amplitude conversion for converting the amplitude of the input signal, which is equal to the calculated input signal, to that of the measured input signal in accordance with the obtained table.

According the present invention, a device for gamma correction and white balance adjustment in a color projection display device comprises: first, second and third color light emitting means for emitting three primary color on a screen (9); means for setting a desired white balance values; means for applying a predetermined luminance signal to each of said first, second and third color light emitting means in separate time slot to form first color, second color and third color raster images; means for measuring luminance value and chromaticity values on a screen for each of first color, second color and third color raster images; means for obtaining a target mixture ratio of the first color, second color and third color projection lights from the measured chromaticity values of the first, second and third colors and the set desired white balance values; means for detecting a color with the weakest brightness; means for calculating, with respect to the detected color, a calculated brightness target value expected to produce on the screen in response to a calculated input signal to be applied to a light emitting means of the detected color; means for measuring, with respect to the detected color, an actual brightness value produced on the screen in response to the calculated input signal actually applied to the light emitting means of the detected color; means for obtaining, with respect to the detected color, a revised input signal, through measurement, which actually produces the brightness target value, and a ratio of the revised input signal to the calculated input signal; and means for applying, with respect to the detected color, an amplitude conversion means for converting the amplitude of the input signal, which is equal to the calculated input signal, to that of the revised input signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 9b is a graph of the gamma correction characteristics of a liquid crystal projection display system, and obtained by the circuit of FIG. 9a;

DETAILED DESCRIPTION OF THE PREFERRED EMBODIMENTS

Figure 1:
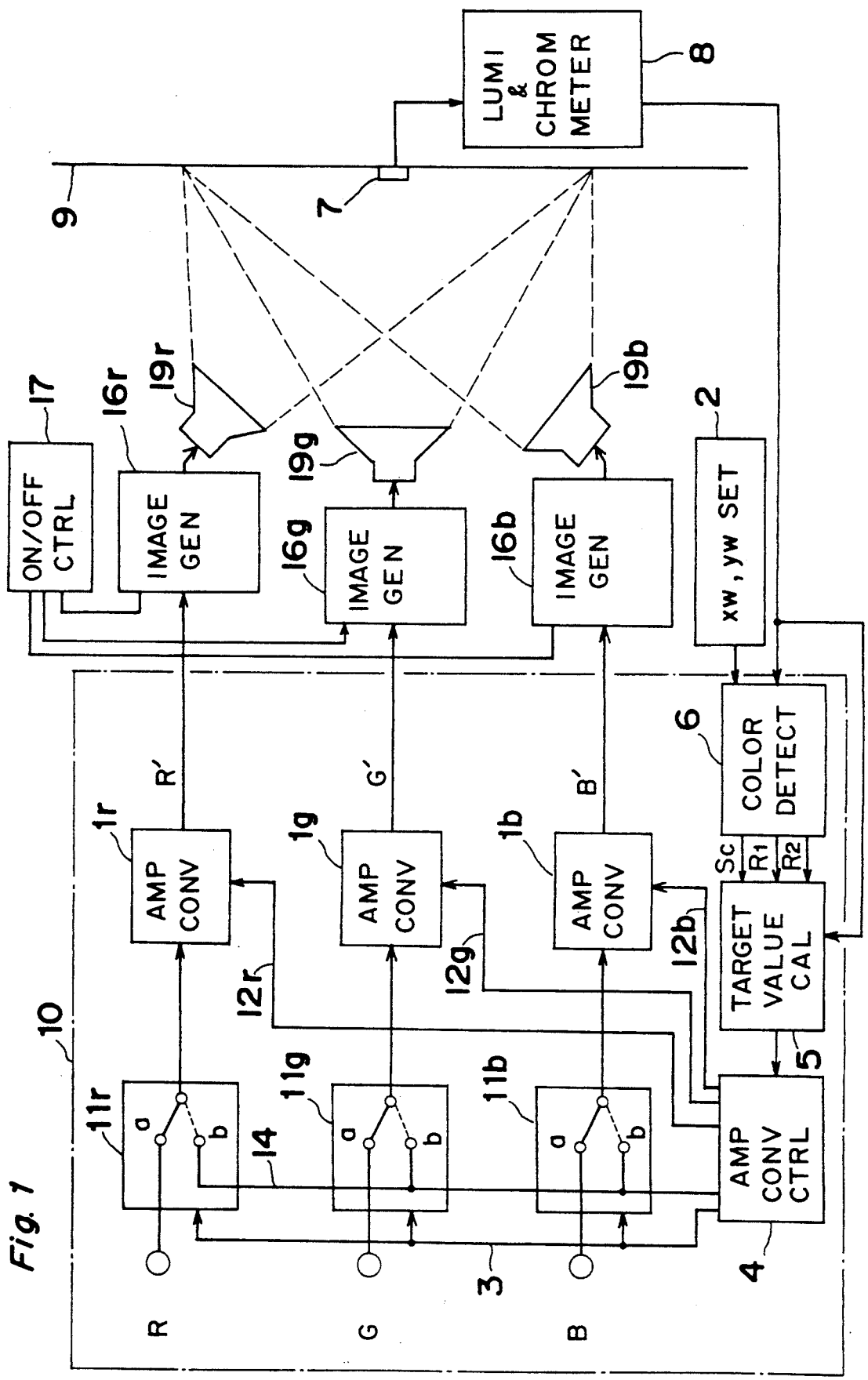
FIG. 1 is a block diagram of a projection display adjustment device according to a first embodiment of the invention.

Referring to FIG. 1, a CRT gamma correction and white balance adjustment apparatus according to a first preferred embodiment of the present invention is shown. The apparatus is employed in a self-luminescent projection display system.

The CRT gamma correction and white balance adjustment apparatus of FIG. 1 comprises amplitude convertor 1r, 1g, and 1b for the red, green, and blue (R, G, B) primary color signals, respectively, a white data (xw, yw) setting circuit 2, an amplitude conversion control 4, target value calculator 5, minimum brightness color detector 6, photodetector 7, luminance and chromaticity meter 8, screen 9, switches 11r, 11g, and 11b, image generators 16r, 16g and 16b for forming red, green, and blue (R, G, B) images, respectively, ON/OFF control 17 for controlling ON and OFF state of image generators 16r, 16g and 16b, and projection optics 19r, 19g and 19b for projecting red, green and blue light images, respectively. The circuits 11r, 11g, 11b, 1r, 1g, 1b, 4, 5 and 6 define a signal processing circuit 10.

A first test is carried out for the white balance adjustment. Initially, the amplitude conversion control 4 provides a switching signal along line 3 to turn the switches 11, 12, and 13 to terminal b, as shown by dotted line. Also, the white data setting circuit 2 is set to produce a desired white data (xw, yw), which is also referred to as a white balance chromaticity target value (xw, yw).

Then amplitude conversion control 4 first provides signals along lines 12r, 12g and 12b to adjust the input/output characteristics of each of the amplitude convertor 1r, 1g and 1b to 1:1. A signal corresponding to a black level is input from the adjustment signal input 14, and the onscreen image is confirmed to be black. Then, the signal corresponding to the maximum luminance on the screen is input from the adjustment signal input 14 to the RGB primary color signal amplitude convertors 1r, 1g and 1b.

Then, ON/OFF control 17 is activated to turn on the image generators 16r, 16g and 16b one at a time to form red image, green image and blue image on the screen 9 individually. The photodetector 7 provided at about center of the screen 9 senses the light, and the luminance and chromaticity meter 8 detects and outputs the luminance values and chromaticity values. During the red image is projected on the screen 9, meter 8 produces a maximum luminance value $Lr_M$ and chromaticity values (xr, yr), in which the chromaticity values are expressed in Yxy color notation. During the green image, meter 8 produces a maximum luminance value $Lg_M$ and chromaticity values (xg, yg), and during the blue image, meter 8 produces a maximum luminance value $Lb_M$ and chromaticity values (xb, yb). These values are applied and stored in the minimum brightness color detector 6.

Then, in the color detector 6, the following equations (1) and (2):

$$R1 = \frac{Yr}{Yg} = \frac{yr}{yg} \cdot \frac{-(xw-xg)(yw-yb)+(xw-xb)(yw-yg)}{(xw-xr)(yw-yb)-(xw-xb)(yw-yr)} \quad (1)$$

and $$R2 = \frac{Yb}{Yg} = \frac{yb}{yg} \cdot \frac{-(xw-xg)(yw-yr)+(xw-xr)(yw-yg)}{(xw-xb)(yw-yr)-(xw-xr)(yw-yb)} \quad (2)$$

are carried out to obtain the luminance ration R1 and R2, wherein Yr is the red projection light luminance value under the desired white balance (xw, yw), Yg is the green projection light luminance value under the desired white balance (xw, yw), and Yb is the blue projection light luminance value under the desired white balance (xw, yw).

Equations (1) and (2) are obtained by solving the relations $$xw = (Sr \cdot xr + Sg \cdot xg + Sb \cdot xb)/(Sr+Sg+Sb) \quad (3)$$

$$yw = (Sr \cdot yr + Sg \cdot yg + Sb \cdot yb)/(Sr+Sg+Sb) \quad (4)$$

between the white balance chromaticity target value (xw, yw) and the measured chromaticity values (xr, yr), (xg, yg), and (xb, yb) of the RGB projection lights, and relations $$Yr = Sr \cdot yr \quad (5)$$

$$Yg = Sg \cdot yg \quad (6)$$

$$Yb = Sb \cdot yb \quad (7)$$

between the RGB luminance values Yr, Yg, Yb and chromaticity y coordinates yr, yg, and yb for the values Yr/Yg and Yb/Yg where Sr, Sg, and Sb are the sums of the tristimulus values of the red, green, and blue projection lights.

By the use of equations (1) and (2), and the measured maximum luminance values $Lr_M$, $Lg_M$ and $Lb_M$ for red, green and blue, color detector 6 further calculates the following ratios.

$$\frac{Lr_M}{Yr}, \frac{Lg_M}{Yg}, \frac{Lb_M}{Yb}$$

Of the three ratios thus obtained, color detector 6 selects the minimum ratio and detects the color with the minimum ratio as a color with the weakest brightness. When the first ratio has the minimum value, red is selected as having the weakest brightness; when the second ratio has the minimum value, green is selected; and when the third ratio has the minimum value, blue is selected. Then, color detector 6 produces a signal Sc indicative of the selected color, and also signals indicative of the ratios R1 and R2 obtained by the equations (1) and (2).

In the target value calculator 5, the projected brightness target value of the selected color and that for the remaining two colors are calculated. When only the white balance adjustment is required, the light for the selected color is projected alone, plural signals at predetermined levels between black and the maximum brightness are input, and the corresponding projected brightness levels are measured to obtain the brightness target value.

Figure 2:
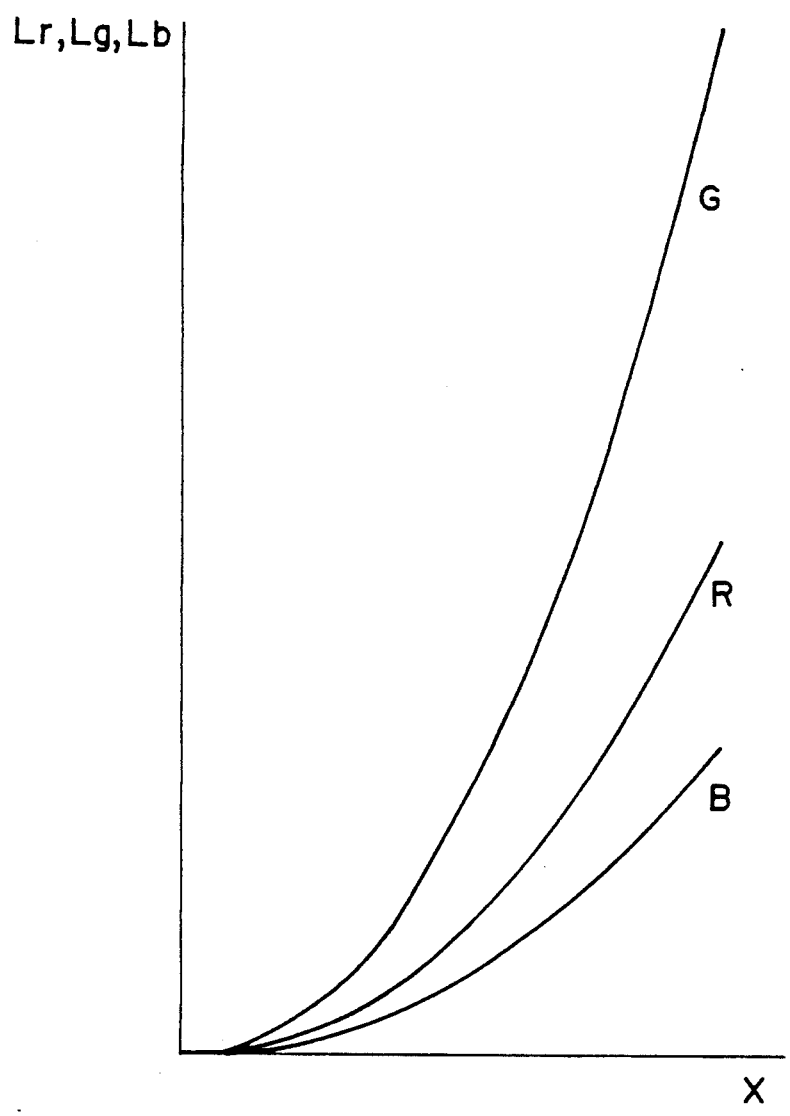
FIG. 2 is a graph showing a relationship between the target brightness levels and various input levels for effecting the white balance adjustment.

In the case of NTSC format system, the CRT gamma correction conversion function shown in equation (8) is applied to the broadcasting signal.

$$Y = YM \cdot (X/XM)^{2.2} \tag{8}$$

where Y is the projection light brightness, X is the signal amplitude, XM is the signal amplitude at maximum brightness, and YM is the maximum brightness of the projection light. When this format is applied to the selected color, which is presumed to be blue as an example, the following equation $$Lb = Lb_M \cdot (X/XM)^{2.2} \tag{9a}$$

is obtained. From equation (9a), since $Lb_M$ and XM are known, it is possible to obtain the target intermediate brightness levels Lb for various input levels X, as shown in FIG. 2. From equations (1) and (2), the following relationships $$R1/R2 = Yr/Yb = Lr/Lb$$

and $$1/R2 = Yg/Yb = Lg/Lb$$

are obtained. Thus, the following equations $$Lr = Lb \cdot (R1/R2) \tag{9b}$$

$$Lg = Lb \cdot (1/R2) \tag{9c}$$

are obtained.

Similarly, when red is selected as a color that has the minimum brightness, $$Lr = Lr_M \cdot (X/XM)^{2.2} \tag{10a}$$

$$Lg = Lr \cdot (1/R1) \tag{10b}$$

$$Lb = Lr \cdot (R2/R1) \tag{10c}$$

are obtained.

When green is selected as a color that has the minimum brightness, $$Lg = Lg_M \cdot (X/XM)^{2.2} \tag{11a}$$

$$Lr = Lg \cdot R1 \tag{11b}$$

$$Lb = Lg \cdot R2 \tag{11c}$$

are obtained.

From equations (9b) and (9c), it is possible to obtain the target intermediate brightness levels Lr and Lg for various input levels X, as shown in FIG. 2. When the equations (9a), (9b) and (9c) are compared, a constant ratio Lr:Lg:Lb=(R1/R2):(1/R2):1 is obtained with respect to any value X. Thus, the white balance adjustment is accomplished.

Next, a second test is carried out for the CRT gamma correction.

Then, the amplification conversion control 4 produces various level signals that change from the minimum level to the maximum level. During the generation of these various level signals, only the red image generator 16r is turned on by the control of ON/OFF control 17, and the luminance values Lr is measured by the meter 8. The measured result is applied to the target value calculator 5.

In the target value calculator 5, various signal levels Xrc for obtaining various intermediate brightness levels Lr for red are calculated from equation (9b), and actually applied signal levels Xrm for obtaining various intermediate brightness levels Lr for red are measured. The calculated various signal levels Xrc and the actually measured signal levels for obtaining various intermediate brightness levels Lr are shown in Table 1 below.

TABLE 1

| Brightness Lr | Calculated levels Xrc | Measured levels Xrm | Ratio Xrm/Xrc |
|---|---|---|---|
| 0 | 0 | 0 | 0 |
| 5 | 1.0 | 1.1 | 1.1 |
| 10 | 1.5 | 1.6 | 1.06666 |
| 15 | 2.0 | 2.2 | 1.1 |
| 20 | 2.5 | 2.6 | 1.04 |
| 30 | 3.0 | 3.0 | 1.0 |
| 40 | 3.5 | 3.5 | 1.0 |
| 55 | 4.0 | 3.9 | 0.975 |
| . | . | . | . |
| 900 | 116.5 | 123.0 | 1.0558 |
| 1200 | 117.0 | 125.0 | 1.0684 |

Figure 3:
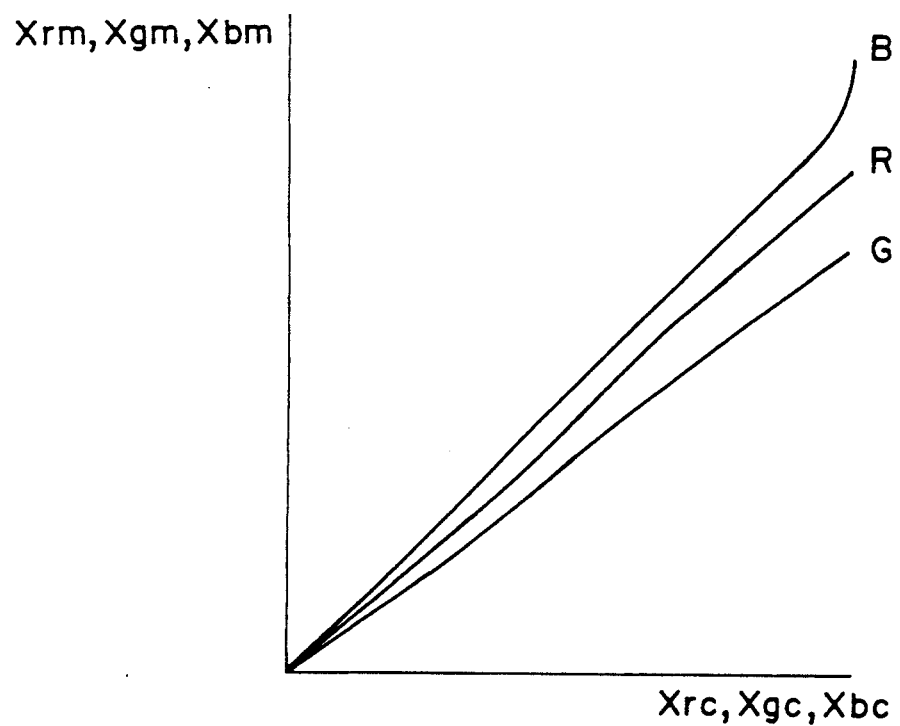
FIG. 3 is a graph showing a relationship between the input signal and the revised input signal.

A relationship between the calculated signal levels Xrc and the measured signal levels Xrm is shown in FIG. 3.

In the amplification conversion control 4, ratios Xrm/Xrc shown in Table 1 are calculated, and the calculated various signal levels Xrc, and the ratios Xrm/Xrc are stored in pairs. The calculated ratios are used for changing the amplification of the amplitude converter 1r. Thus, when the input level of signal R to the amplitude converter 1r is, e.g., 4.0, the amplification converter amplifies the input signal by 0.975 so that the amplification converter changes the amplification to 3.9 for obtaining the brightness level of 55 for red.

Similarly, the amplification conversion control 4 stores the calculated various signal levels Xgc and the ratios Xgm/Xgc for green and the calculated various signal levels Xbc and the ratios Xbm/Xbc for blue. Such ratios may be permanently stored in the corresponding amplification convertors 1r, 1g and 1b, or a simulation circuit may be provided to produce the required ratios, as will be described below.

Figure 5:
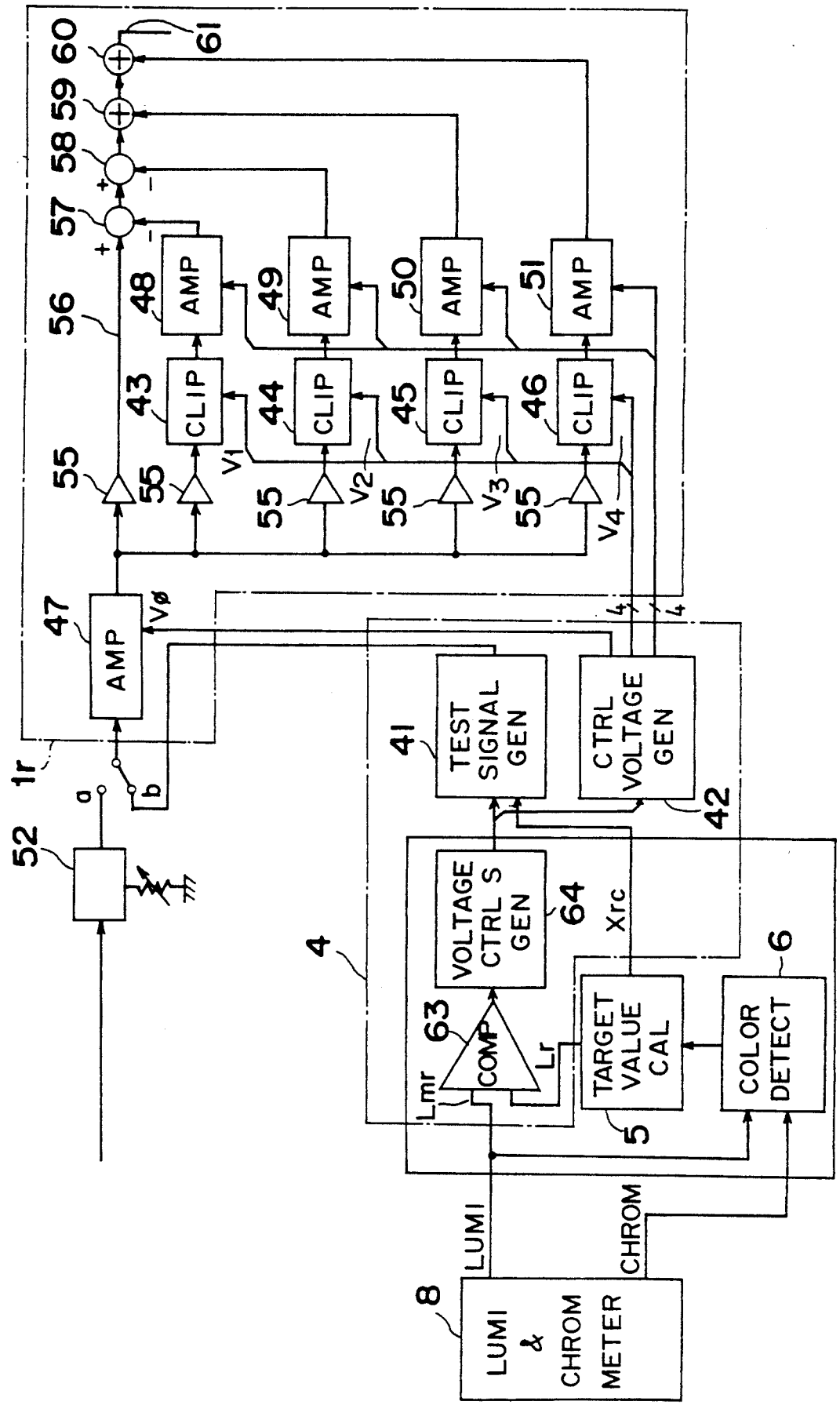
FIG. 5 is a circuit diagram of a projection display adjustment apparatus of a feedback type employed in the present invention.
Figure 6:
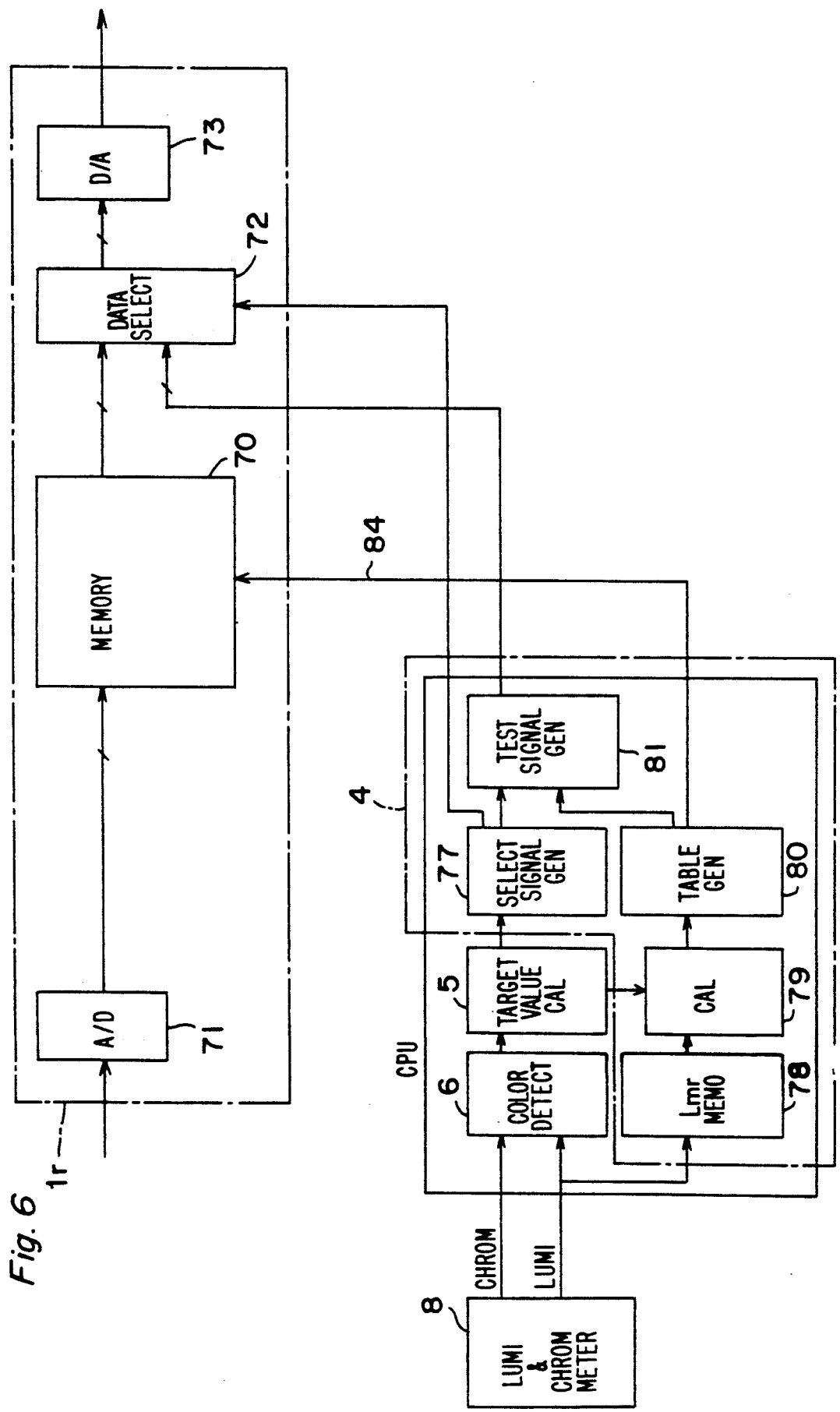
FIG. 6 is a circuit diagram of a projection display adjustment apparatus of a non-feedback type employed in the present invention.

There are two possible methods to obtain the ratios, one using a feedback loop (FIG. 5) and one not using a feedback loop (FIG. 6).

With the feedback loop method, control information is sent from the target value calculator 5 to the amplitude conversion control 4, the amplitude conversion control 4 controls the amplitude of the signal convertor and projects light to the screen 9. The brightness of the projection light is measured at the picture plane and is output to the target value calculator 5. The difference between the measured value and the target value is obtained, and the control information output to the amplitude conversion control 4 is changed accordingly. This process loop is repeated for each signal level until the measured value converges with the target value.

With the non-feedback loop method, the input/output characteristics of the amplitude convertor is set to 1:1 for each color, the adjustment signal input 14 for each level of each color is output from the amplitude conversion control 4, and the screen brightness at this time is input to the target value calculator 5. The screen brightness is compared with the target value obtained for each signal level, an input/output characteristics function for the amplitude convertor is calculated from this relationship, and the actual amplitude conversion is performed with a conversion table.

The same process is performed by inputting the second and third primary color signals at each of the predetermined signal levels, making it possible to adjust the white balance to the white balance target value by adjusting the second and third primary color projection lights so that the target values are obtained.

The detail of the feedback loop method and nonfeedback method will be described later in connection with FIGS. 5 and 6.

Figure 4:
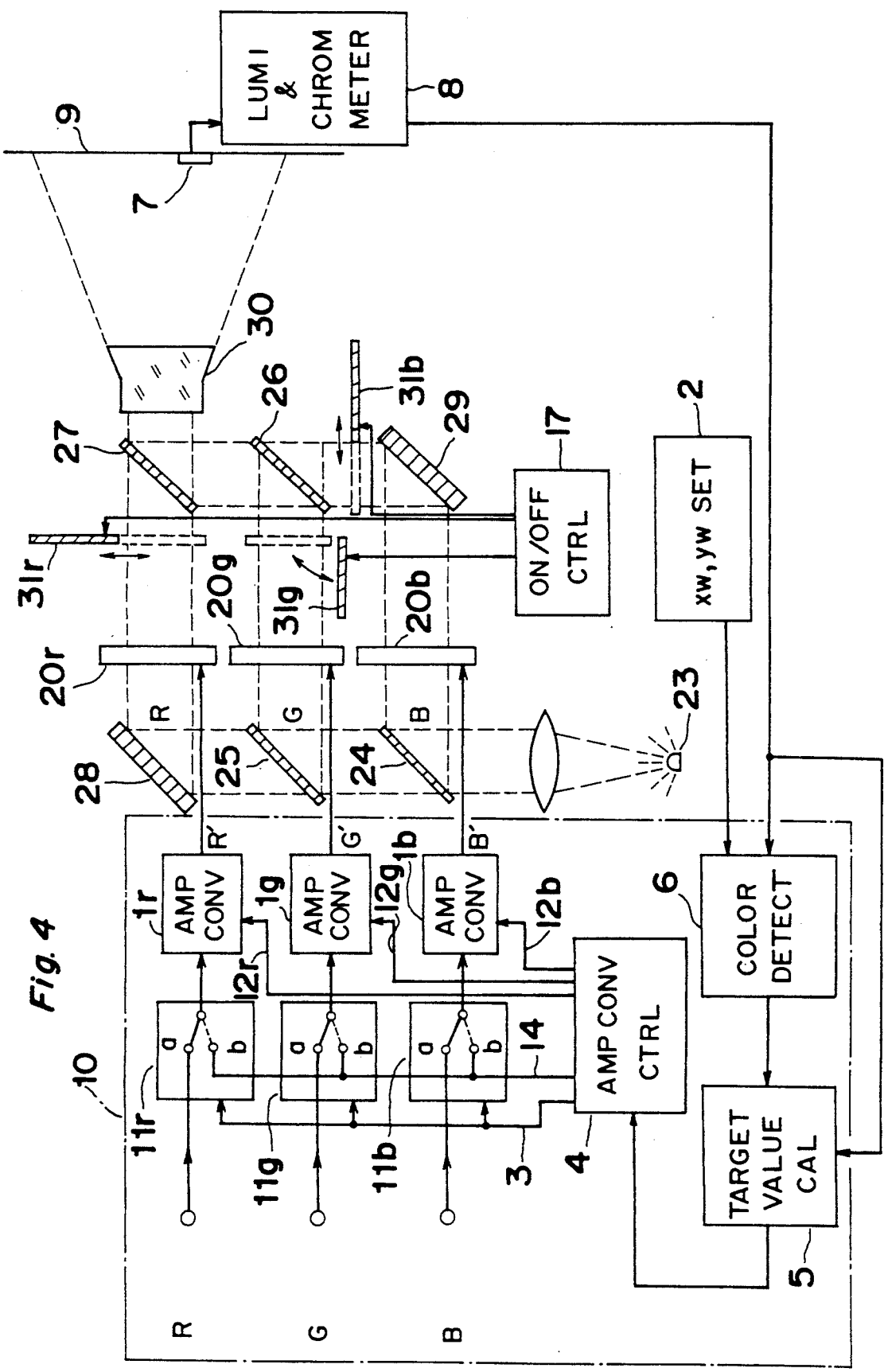
FIG. 4 is a block diagram of a projection display adjustment device according to a second embodiment of the invention.

Referring to FIG. 4, an LV gamma correction and white balance adjustment apparatus according to a second preferred embodiment of the present invention is shown. The apparatus is employed in a light valve projection display system.

The LV gamma correction and white balance adjustment apparatus of FIG. 4 comprises amplitude convertor 1r, 1g, and 1b for the red, green, and blue (R, G, B) primary color signals, respectively, a white data (xw, yw) setting circuit 2, an amplitude conversion control 4, target value calculator 5, minimum brightness color detector 6, photodetector 7, luminance and chromaticity meter 8, screen 9, switches 11r, 11g, and 11b.

The circuit shown in FIG. 4 further comprises a light source 23, dichroic mirrors 24 and 25 and a mirror 28 for splitting the light from the light source 23 and producing red, green, and blue light components, three corresponding liquid crystal (LC) light valves 20r, 20g and 20b for passing the red, green and blue lights, respectively at a transmittance determined by the signals R', G' and B', dichroic mirrors 26 and 27 and a mirror 29 for synthesizing the red, green, and blue images to a full-color image, and a projection lens 30 for projecting the full-color image on the screen 9.

Movable shields 31r, 31g and 31b operated by ON-/OFF control 17 are provided in the paths of red, green and blue lights, respectively to intercept the lights. The light shields are used to obtain the monochrome red, green, and blue lights because it is not possible with current technology to set the LC light valve transmittance to a true zero by means of signal processing devices.

Adjustment of the white balance and LV gamma correction in this second embodiment is described next.

At first, the input/output characteristics of the amplitude convertors 1r, 1g, and 1b are set to 1:1. Then, the switches 11r, 11g and 11b are turned to terminal b, and amplitude conversion control 4 produces a test signal which is a maximum level signal for producing a white image. In accordance with the test signal, the transmittance of the light valves 20r, 20g and 20b changes. In this case, each of the light valves 20r, 20g and 20b is fully opened.

In the first test for the white balance adjustment, shield 31r opens and shields 31g and 31b close to permit the generation of only red image on the screen 9. Thus, from meter 8, the maximum luminance value $Lr_M$ and chromaticity values (xr, yr) are obtained. Then, only the shield 31g opens to obtain the maximum luminance value $Lg_M$ and chromaticity values (xg, yg). Then, only the shield 31b opens to obtain the maximum luminance value $Lb_M$ and chromaticity values (xb, yb). These values are applied and stored in the minimum brightness color detector 6, as well as the desired white data (xw, yw) as set by the white data setting circuit 2. Then, in the minimum brightness color detector 6, the luminance ratios R1 and R2 using equations (1) and (2), and a color with the weakest brightness are obtained in the same manner described above. Next, in the target value calculator 5, brightness target levels Lr for various input levels X, as shown in FIG. 2 are calculated.

Next, a second test is carried out for the LV gamma correction.

The amplification conversion control 4 produces various level signals that change from the minimum level to the maximum level. During the generation of these various level signals, only the red image is formed on the screen 9 by the control of ON/OFF control 17, and the luminance values Lr is measured by the meter 8. The measured result is applied to the target value calculator 5.

Figure 7:
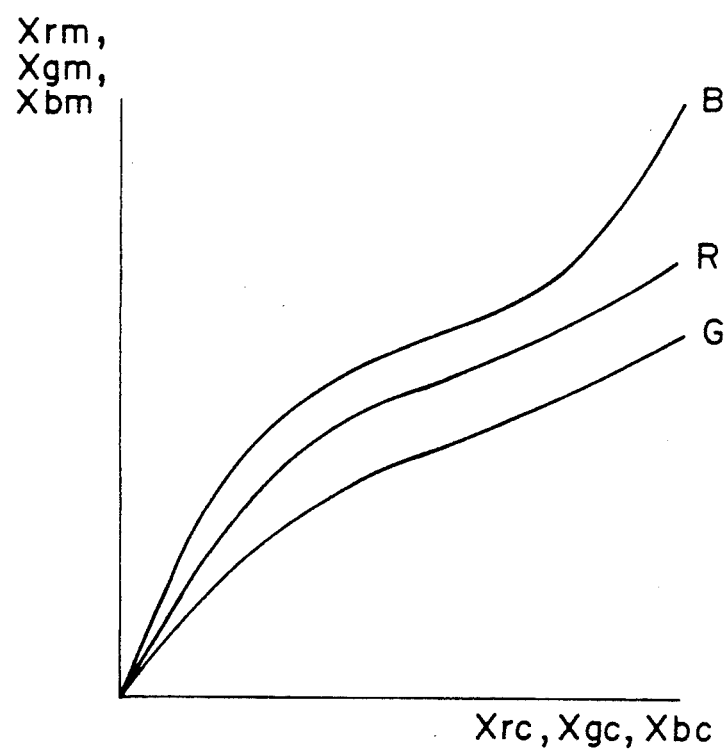
FIG. 7 is a graph of the gamma correction characteristics of a liquid crystal projection display system, and obtained by the circuit of FIG. 6.

In the target value calculator 5, various signal levels Xrc for obtaining various intermediate brightness levels Lr for red are calculated from equation (9b), and actually applied signal levels Xrm for obtaining various intermediate brightness levels Lr for red are measured. A relationship between the calculated signal levels Xrc and the measured signal levels Xrm is shown in FIG. 7.

In the amplification conversion control 4, ratios Xrm/Xrc are calculated, and the calculated various signal levels Xrc, and the ratios Xrm/Xrc are stored in pairs.

Similarly, the amplification conversion control 4 stores the calculated various signal levels Xgc and the ratios Xgm/Xgc for green and the calculated various signal levels Xbc and the ratios Xbm/Xbc for blue.

Referring to FIG. 5, a circuit for setting the ratios for the LV gamma correction and white balance adjustment apparatus with the feedback loop is shown. The circuit shown comprises a comparator 63 for comparing the brightness target value as stored in the target value calculator 5 with the actually measured luminance value and produces a difference signal indicative of the difference between the actually measured luminance value and the brightness target value, a voltage control signal generator 64 for generating a voltage control signal relatively to the difference signal, a test signal generator 41 and a control voltage generator 42.

It is to be noted that circuits 63, 64, 41 and 42 corresponds amplification conversion control 4 shown in FIG. 4. Also, the circuits 5, 6, 63 and 64 can be formed in a computer.

The circuit shown in FIG. 5 further comprises five buffers 55, base clippers 43, 44, 45, and 46, voltage control amplifiers 47, 48, 49, 50, and 51, subtractors 57 and 58, and adders 59 and 60, which taken together correspond to the amplitude converter 1r.

It is further to be noted that, although in FIG. 5 only one amplitude converter 1r is shown, there are similar circuits for the amplitude converters 1g and 1b.

In operation, the target value calculator 5 generates a calculated signal level Xrc for obtaining a first specific brightness level Lr for red from equation (9b) and, provides the first signal level Xrc (first clipping voltage V1) to the test signal generator 41 and, at the same time, the calculated brightness level Lr to the comparator 63. At this stage, the control voltage generator 42 produces a signal so that the total amplification ratio is 1:1.. Thus, the first signal level Xrc (=V1) is produced from output 61 Then, in response to the first signal level Xrc, red image is formed on the screen 9 and the actual and measured luminance Lrm is applied from meter 8 to comparator 63. If the measured luminance Lrm is smaller than the calculated luminance Lr, comparator 63 produces $+\Delta L$ representing the difference. Based on this difference $+\Delta L$, control voltage generator 42 changes the amplification ratio of the amplifier to increase the first signal level and, in turn, to increase the luminance on the screen 9. Then, when the comparator 63 compares the newly measured luminance Lrm with the calculated luminance Lr. If the newly measured luminance Lrm is greater than the calculated luminance Lr, comparator 63 produces $-\Delta L$. In this manner, control voltage generator 42 changes the control voltage until the measured luminance Lrm becomes substantially equal to the calculated luminance Lr. Then, control voltage generator 42 sets the finally obtained voltage for the first signal level Xrc (=V1').

Figure 8A:
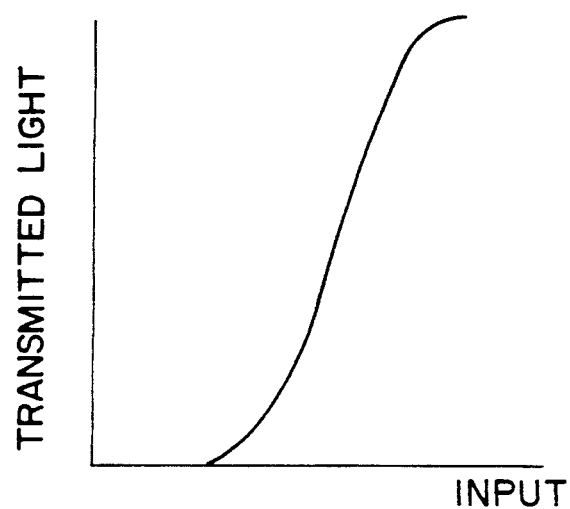
FIG. 8a is a graph of the transmittance characteristics of a liquid crystal light valve.
Figure 8B:
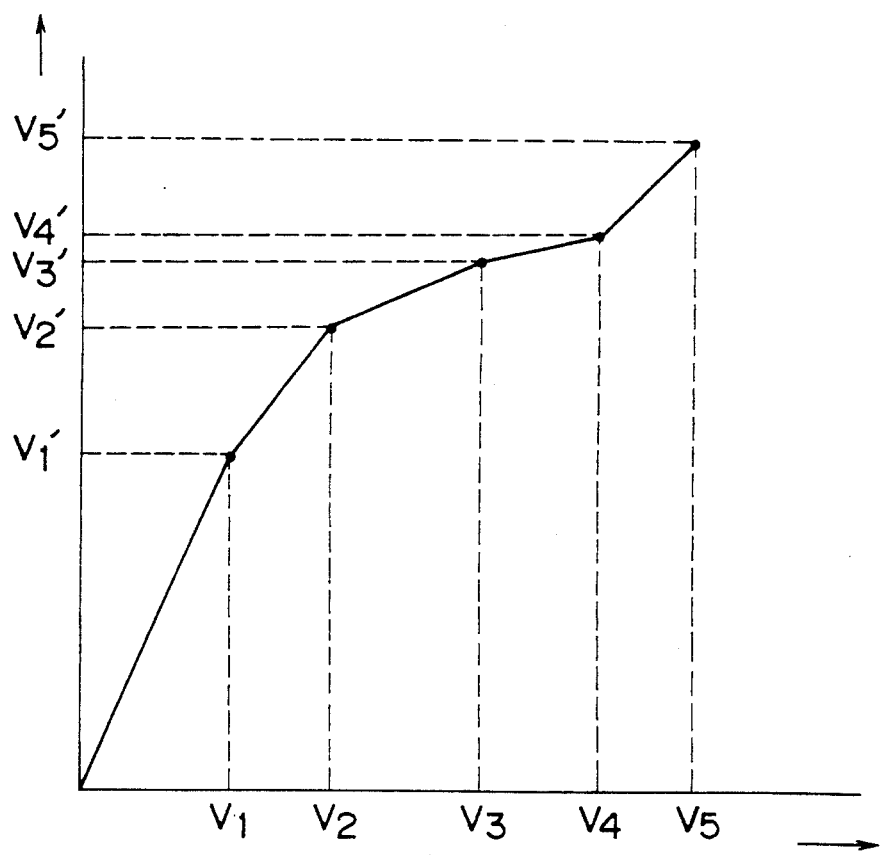
FIG. 8b is a graph of the gamma correction characteristics of a liquid crystal projection display system, and obtained by the circuit of FIG. 5.
Figure 9A:
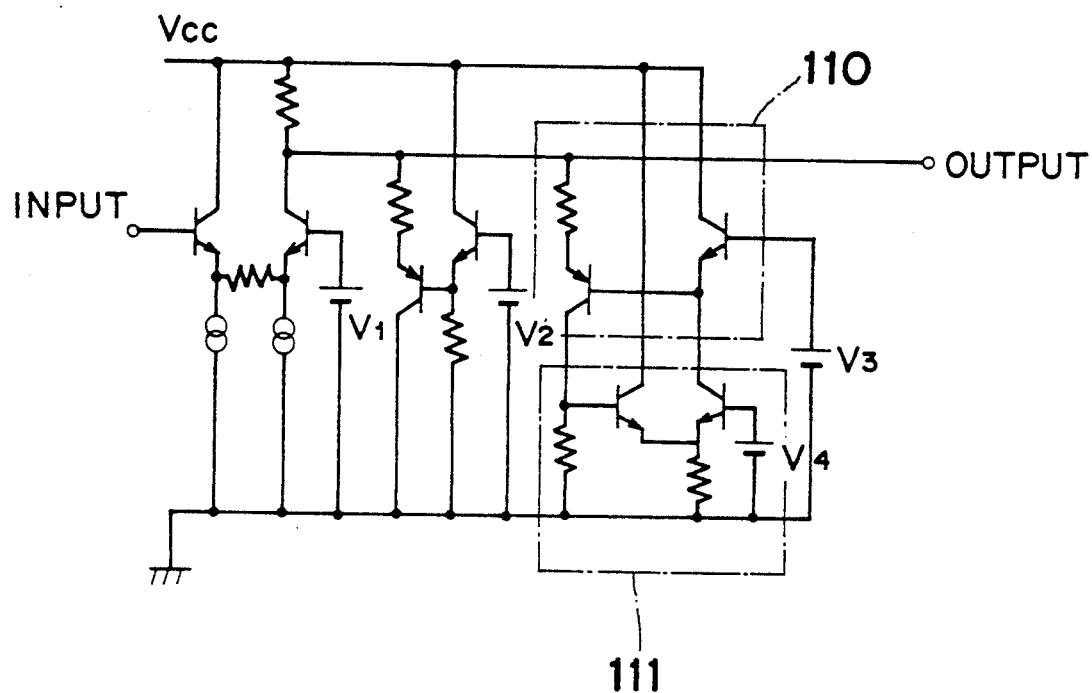
FIG. 9a is an example of a conventional gamma correction circuit in a liquid crystal projection display system.
Figure 9B:
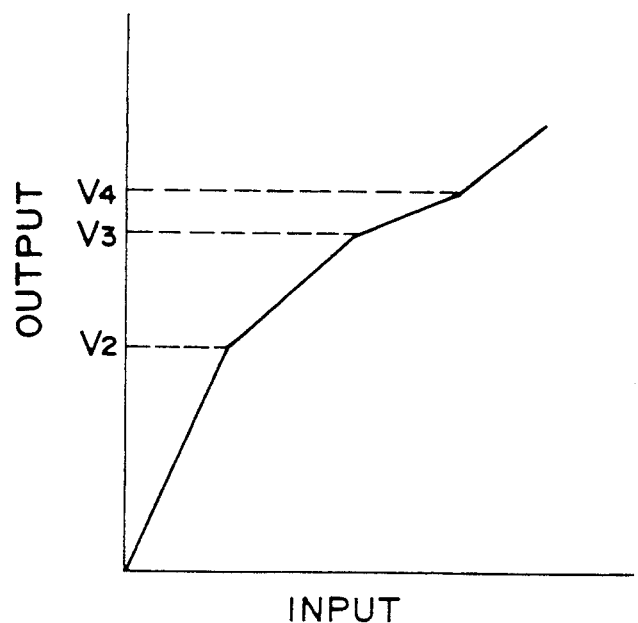

Similar operations are carried out for the second, third, fourth and fifth signal levels V2, V3, V4 and V5 to obtain LV gamma corrected signal levels V2', V3', V4' and V5'. The input/output characteristics for the amplitude converter 1r is shown in FIG. 8b. In the above described operation, the clipping levels V1, V2, V3, and V4 are input to the base clippers 43, 44, 45, and 46.

The same process is performed for the second and third primary color signals to complete white balance and LV gamma correction adjustment.

Referring to FIG. 6, a circuit for setting the ratios for the LV gamma correction and white balance adjustment apparatus with the non-feedback loop is shown. The circuit shown comprises a select signal generator 77, a brightness data (Lmr) memory 78, a calculator 79 for calculating the equation (12), a table generator 80, and a test signal generator 81. It is to be noted that circuits 77, 78, 79, 80 and 81 taken together serves as the amplitude conversion control 4. Also, it is to be noted that circuits 77, 78, 79, 80, 81, 5 and 6 may be formed in a computer.

The apparatus of FIG. 6 further comprises an A/D converter 71, a memory 70 for storing a table, a data selector 72, and D/A converter 73 which taken together define the amplitude convertor 1r. It is to be noted that, although in FIG. 6 only one amplitude converter 1r is shown, there are similar circuits for the amplitude converters 1g and 1b.

In operation, the minimum brightness color detector 6 selects the lowest brightness primary color, and the target value calculator 5 calculates the target mixture ratio and the brightness target value for the RGB projection lights, such as shown in FIG. 2 in the same manner described above.

Then, select signal generator 77 generates a selection signal to data selector 72 to select test signals from test signal generator 81. Starting from red, the test signal generator 81 receives gradually increasing test signals for red from the target value calculator 5 for producing the luminance shown in FIG. 2. The gradually increasing test signal is used for forming the red raster image on the screen 9. Thus, by the gradually increasing test signal, it is expected that the luminance of the red image also gradually increases along the curve shown in FIG. 2. However, because of non-linear transmittance characteristics of the light valve, the actual increase of the luminance on the screen is not the same as the curve shown in FIG. 2. The measured luminance signal Lmr from meter 8 is sequentially stored in brightness data memory 78 together with the increasing test signal in pairs.

Then, in calculator 79, a test signal T1 used for producing an expected luminance on the screen is picked from the target value calculator 5, and a test signal T1' which actually produced the expected luminance on the screen is picked from the brightness data memory 78. Then, the test signal T1 picked from the calculator 5 and the test signal T1' picked from the data memory 78 are stored in a pair in the table generator 80. In this manner, in the table generator 80, the test signals Ti from the calculator 5 and the test signals Ti' from the data memory 78 are sequentially stored in pairs so that a number of required points are plotted on the curve for red shown in FIG. 2 to complete a table. The table generated in the table generator 80 is transmitted to memory 70 for the permanent use.

Then, when the actual video signal is applied to the memory 70, the input signal Ti is converted to signal Ti' by the use of the table and the signal Ti, is used to produce the luminance which was expected to be produce by the input signal Ti.

In the above operation, the brightness target value calculated in the target value generator 5 can be expressed as:

$$Y = f(X), \tag{10}$$

and the actually measured brightness value as stored in data memory 78 can be expressed as:

$$Y = g(X). \tag{11}$$

Then, the calculator 79 calculates the I/O conversion function which is the sum of the inverse function of equation (11) and equation (10), and can be expressed as $$X_o = g^{-1}(f(X_i)). \tag{12}$$

The I/O conversion table obtained by equation (12) is stored in memory 70. Similar I/O conversion tables are stored in memories in other amplitude convertors 1g and 1b.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

For example, while brightness is used to express the target value of the image brightness in these embodiments, any other unit expressing the luminance of light can also be used. The gamma correction function of these embodiments is also not limited to the conversion function shown in equation (8), and any other gamma correction function can also be used. The circuit shown in FIG. 5 is achieved by signal amplitude conversion at the four break points shown in FIG. 8b, but another number of points can also be used. In addition, the addition/subtraction circuits 57-60 in FIG. 5 should be appropriately selected according to the transmittance-voltage characteristics of the LC light valves.

What is claimed is:

1. A method for white balance adjustment in a color projection display device having first, second and third color light emitting means which are used to form an image on a screen, said method comprising the steps of:
   (a) setting desired white balance values (xw, yw);
   (b) applying a predetermined luminance signal to each of said first, second and third color light emitting means in separate time slots to form first color, second color and third color raster images on the screen;
   (c) measuring chromaticity values (xr, yr; xg, yg; xb, yb) for each of the first color, second color and third color raster images on the screen;
   (d) obtaining a target mixture ratio for controlling the first color, second color and third color light emitting means from the measured chromaticity values of the first, second and third color raster images and the set desired white balance values; and
   (e) processing received red, green and blue signals as a function of the obtained target mixture ratio, when producing an image on the screen.

2. A method as claimed in claim 1, wherein said obtaining step obtains the target mixture ratio Lr:Lg:Lb by calculating $R1 =$ $$\frac{Yr}{Yg} = \frac{yr}{yg} \cdot \frac{-(xw - xg)(yw - yb) + (xw - xb)(yw - yg)}{(xw - xr)(yw - yb) - (xw - xb)(yw - yr)}$$

$R2 =$ $$\frac{Yb}{Yg} = \frac{yb}{yg} \cdot \frac{-(xw - xg)(yw - yr) + (xw - xr)(yw - yg)}{(xw - xb)(yw - yr) - (xw - xr)(yw - yb)}$$

and $$Lr:Lg:Lb = Yr:Yg:yb = (R1/R2):(1/R2):1.$$

3. A method for gamma correction and white balance adjustment in a color projection display device having first, second and third color light emitting means which are used to form an image on a screen, said method comprising the steps of:
   (a) setting desired white balance values (xw, yw);
   (b) applying a predetermined luminance signal to each of said first, second and third color light emitting means in separate time slots to form first color, second color and third color raster images on the screen;
   (c) measuring luminance values ($Lr_M$, $Lg_M$, $Lb_M$) and chromaticity values (xr, yr; xg, yg; xb, yb) for each of the first color, second color and third color raster images on the screen;
   (d) obtaining a target mixture ratio of the first color, second color and third color light emitting means from the measured chromaticity values of the first, second and third color raster images and the set desired white balance values;
   (e) detecting a color with the weakest brightness;
   (f) calculating, with respect to the detected color, brightness target values expected to be produced on the screen in response to calculated input signals applied to a light emitting means of the detected color;
   (g) measuring, with respect to the detected color, actual brightness values produced on the screen in response to the calculated input signals actually applied to the light emitting means of the detected color;
   (h) obtaining, with respect to the detected color, a table of a list of the calculated input signals expected to produce the brightness target values and a corresponding light of measured input signals which actually produced the calculated brightness target values; and
   (i) converting, with respect to the detected color, the amplitude of the input signal, which is equal to the calculated input signal, to that of the measured input signal in accordance with the obtained table in order to produce an image on the screen.

4. A method as claimed in claim 3, further comprising the steps of:
   (j) repeating the steps (f) to (i) for each of the two remaining colors.

5. A method as claimed in claim 3, wherein said first, second and third color light emitting means comprises first, second and third CRTs.

6. A method as claimed in claim 3, wherein said first, second and third color light emitting means comprises first, second and third light valves.

7. A method for gamma correction and white balance adjustment in a color projection display device having first, second and third color light emitting means which are used to form an image on a screen, said method comprising the steps of:
   (a) setting desired white balance values (xw, yw);
   (b) applying a predetermined luminance signal to each of said first, second and third color light emitting means in separate time slots to form first color, second color and third color raster images on the screen;
   (c) measuring luminance values ($Lr_M$, $Lg_M$, $Lb_M$) and chromaticity values (xr, yr; xg, yg; xb, yb) for each of the first color, second color and third color raster images on the screen;
   (d) obtaining a target mixture ratio of the first color, second color and third color light emitting means from the measured chromaticity values of the first, second and third color raster images and the set desired white balance values;

(e) detecting a color with the weakest brightness;

(f) calculating, with respect to the detected color, a brightness target value expected to be produced on the screen in response to calculated input signal applied to a light emitting means of the detected color;

(g) measuring, with respect to the detected color, an actual brightness values produced on the screen in response to the calculated input signal actually applied to the light emitting means of the detected color;

(h) obtaining, with respect to the detected color, a revised input signal, through measurement, which actually produces the brightness target values and a ratio of the revised input signal to the calculated input signal; and (i) converting, with respect to the detected color, the amplitude of the input signal, which is equal to the calculated input signal, to that of the revised input signal in order to produce an image on the screen.

8. A method as claimed in claim 7, further comprising the steps of:

(j) repeating the steps (f) to (i) for each of the two remaining colors.

9. A method as claimed in claim 7, wherein said first, second and third color light emitting means comprises first, second and third CRTs.

10. A method as claimed in claim 7, wherein said first, second and third color light emitting means comprises first, second and third light valves.

11. A device for white balance adjustment in a color projection display device which is used to form an image on a screen comprising:

first, second and third color light emitting means for emitting three primary colors on a screen;

means for setting desired white balance values;

means for applying a predetermined luminance signal to each of said first, second and third color light emitting means in separate time slots to form first color, second color and third color raster images on the screen;

means for measuring chromaticity values for each of the first color, second color and third color raster images on the screen;

means for obtaining a target mixture ratio for controlling the first color, second color and third color light emitting means from the measured chromaticity values of the first, second and third color raster images and the set desired white balance values; and means for processing received red, green and blue signals, as a function of the obtained target mixture ratio, to produce an image on the screen.

12. A device for gamma correction and white balance adjustment in a color projection display device which is used to form an image on a screen comprising:

first, second and third color light emitting means for emitting three primary colors on a screen;

means for setting desired white balance values;

means for applying a predetermined luminance signal to each of said first, second and third color light emitting means in separate time slots to form first color, second color and third color raster images on the screen;

means for measuring luminance value and chromaticity values for each of the first color, second color and third color raster images on the screen;

means for obtaining a target mixture ratio of the first color, second color and third color light emitting means from the measured chromaticity values of the first, second and third color raster images and the set desired white balance values;

means for detecting a color with the weakest brightness;

means for calculating, with respect to the detected color, brightness target values expected to be produced on the screen in response to calculated input signals applied to a light emitting means of the detected color;

means for measuring, with respect to the detected color, actual brightness values produced on the screen in response to the calculated input signals actually applied to the light emitting means of the detected color;

means for obtaining, with respect to the detected color, a table of a list of the calculated input signals expected to produce the brightness target values and a corresponding light of measured input signals which actually produced the calculated brightness target values; and means for converting, with respect to the detected color, the amplitude of the input signal, which is equal to the calculated input signal, to that of the measured input signal in accordance with the obtained table in order to produce an image on the screen.

13. A device for gamma correction and white balance adjustment in a color projection display device which is used to form an image on a screen comprising:

first, second and third color light emitting means for emitting three primary colors on a screen;

means for setting desired white balance values;

means for applying a predetermined luminance signal to each of said first, second and third color light emitting means in separate time slots to form first color, second color and third color raster images on the screen;

means for measuring luminance values and chromaticity values for each of the first color, second color and third color raster images on the screen;

means for obtaining a target mixture ratio of the first color, second color and third color light emitting means from the measured chromaticity values of the first, second and third color raster images and the set desired white balance values;

means for detecting a color with the weakest brightness;

means for calculating, with respect to the detected color, brightness target value expected to be produced on the screen in response to a calculated input signal applied to a light emitting means of the detected color;

means for measuring, with respect to the detected color, an actual brightness value produced on the screen in response to the calculated input signal actually applied to the light emitting means of the detected color;

means for obtaining, with respect to the detected color, a revised input signal, through measurement, which actually produces the brightness target values, and a ratio of the revised input signal to the calculated input signal; and means for converting, with respect to the detected color, the amplitude of the input signal, which is equal to the calculated input signal, to that of the revised input signal in order to produce an image on the screen.

* * * * *

UNITED STATES PATENT AND TRADEMARK OFFICE
CERTIFICATE OF CORRECTION

PATENT NO.    : 5,315,378
DATED         : May 24, 1994
INVENTOR(S)   : Satou et al.

It is certified that error appears in the above-identified patent and that said Letters Patent is hereby corrected as shown below:

Column 13, line 47, after "signals" insert --,--.

Column 14, line 33, change "light" to --list--.

Column 15, line 6, after "to" insert --a--.

Column 15, line 10, change "values" to --value--.

Column 15, line 16, change "values" to --value--.

Column 16, line 20, change "light" to --list--.

Column 16, line 50, before "brightness" insert --a--.

Column 16, lines 61 and 62, change values" to --value--.

Signed and Sealed this

Eighteenth Day of October, 1994

BRUCE LEHMAN

*Attest:*

*Attesting Officer*  *Commissioner of Patents and Trademarks*